US008552581B2

(12) United States Patent
Miller (10) Patent No.: US 8,552,581 B2
(45) Date of Patent: Oct. 8, 2013

(54) PORTABLE SOLAR AND WIND-POWERED ENERGY GENERATING SYSTEM

(76) Inventor: Lynn A. Miller, Crossville, TN (US)

(*) Notice: Subject to any disclaimer, the term of this patent is extended or adjusted under 35 U.S.C. 154(b) by 241 days.

(21) Appl. No.: 13/047,548

(22) Filed: Mar. 14, 2011

(65) Prior Publication Data

US 2011/0221203 A1 Sep. 15, 2011

Related U.S. Application Data

(66) Substitute for application No. 61/282,656, filed on Mar. 12, 2010.

(51) Int. Cl.
*F03D 9/00* (2006.01)
(52) U.S. Cl.
USPC .............................................. 290/55; 361/601
(58) Field of Classification Search
USPC ....................................... 361/601; 290/54–55
See application file for complete search history.

(56) References Cited

U.S. PATENT DOCUMENTS

| 4,421,943 | A | * | 12/1983 | Withjack | 136/246 |
|---|---|---|---|---|---|
| 5,125,608 | A | | 6/1992 | McMaster et al. | |
| 5,969,501 | A | | 10/1999 | Glidden et al. | |
| 6,201,181 | B1 | | 3/2001 | Azzam et al. | |
| 6,559,552 | B1 | | 5/2003 | Ha | |
| 7,469,541 | B1 | | 12/2008 | Melton et al. | |
| 7,492,120 | B2 | | 2/2009 | Benn et al. | |
| 7,513,250 | B2 | | 4/2009 | Head et al. | |
| 8,299,645 | B2 | * | 10/2012 | Muchow et al. | 290/55 |
| 2008/0068782 | A1 | * | 3/2008 | Muchow et al. | 361/601 |
| 2008/0196758 | A1 | * | 8/2008 | McGuire | 136/245 |
| 2009/0079161 | A1 | | 3/2009 | Muchow et al. | |
| 2010/0207452 | A1 | * | 8/2010 | Saab | 307/65 |

OTHER PUBLICATIONS

What are SIPs? One Internet page, Nov. 12, 2009 http://www.sips.org/content/about/index.cfm?pageId=7.

* cited by examiner

*Primary Examiner* — Truc Nguyen
(74) *Attorney, Agent, or Firm* — Richard C Litman (57) ABSTRACT

The portable solar and wind-powered energy generating system provides an ecologically friendly, portable system for generating electricity. The system includes a portable enclosure having a roof, along with first and second solar modules. The first solar module is mounted on the roof of the portable enclosure. A portable vertical support is removably positioned adjacent the portable enclosure. A wind turbine is preferably mounted on an upper end thereof. An extensible support releasably extends between the roof and the vertical support for releasably supporting the second solar module. Preferably, a third solar module is further provided, and a collapsible support is mounted on the portable vertical support for releasably supporting the third solar module. The wind turbine is in electrical communication with the first, second and third solar modules, and generated electricity is delivered to an electrical load, such as a storage battery, a charger for electrical vehicles, or the like.

5 Claims, 10 Drawing Sheets

PORTABLE SOLAR AND WIND-POWERED ENERGY GENERATING SYSTEM

CROSS-REFERENCE TO RELATED APPLICATION

This application claims the benefit of U.S. Provisional Patent Application Ser. No. 61/282,656, filed Mar. 12, 2010.

BACKGROUND OF THE INVENTION

1. Field of the Invention

The present invention relates to electrical generation, and particularly to a portable solar and wind-powered energy generating system that provides an ecologically friendly, portable system for generating electricity for to be delivered to an electrical load, such as a storage battery, a power outlet, a charger for electrical vehicles or the like, or a combination thereof, or, alternatively, the electrical energy may be transmitted into the pre-existing electrical power grid.

2. Description of the Related Art

Concerns over rising pollution, global warming and the cost of fuel have led to a greater interest in the use of electric power for powering vehicles, either using electric power alone, or electric power in a hybrid vehicle, which also includes a tandem internal combustion engine. The initial limitation on an electric vehicle was the charging capacity of the batteries, so as to allow the vehicle to operate at comparable speeds with internal combustion engines and over comparable time periods.

Technological advances in storage cell design have made electric vehicles a viable alternative to internal combustion engines; however, the ability to recharge the storage cell or batteries remains a major drawback to acceptance by the general populace. For example, improved storage cells may give an electric vehicle a range of 100 miles at comparable speeds with internal combustion engines. This limits the user to a 50-mile radius from his or her home, since he or she must make a return trip in order to recharge the storage cells. Recharging typically involves a power cable connected between the vehicle and a charging station or electrical outlet located within the user's garage or dwelling.

If charging stations were available in public or private locations, such as parking garages, rest stops, or private parking lots associated with a particular business, the electric vehicle could be recharged while in the parking space or parking lot while the driver is at work or shopping. The availability of such charging stations would encourage the purchase of electric vehicles, since potential buyers and users would know that they were not limited to a drive or commute that was set by the charge of the battery or storage cell.

The ability and option to recharge a hybrid vehicle would provide the driver with a choice in fuel selection. The cost of a unit of electricity (measured in kilowatt-hours) is usually significantly more cost effective when compared with a similar unit of a fossil fuel, hydrogen, or alcohol-based fuel. Electricity, however, is typically provided through the conventional electrical grid, and power plants generate electricity through the burning of fossil fuels or through the usage of potentially hazardous nuclear power systems.

As time goes on, the demand for electrical power continues to increase unabated. As a result of the rapid increase in oil and natural gas prices since the late 1990's, the growing awareness that emissions from fossil-fuel sources is the likely cause of global warming, and the need for energy independence for national security reasons, there has been an increased demand for cost-effective electric power generated from renewable resources, such as wind and solar.

In response to this demand, along with innovations in wind turbine design and efficiency, large utility-scale wind turbine electric generator farms (commonly referred to as "big wind") have been constructed in remote areas of the country with high wind potential. This increasingly competitive source of energy is steadily providing a growing share of U.S. electricity without consuming any natural resource or emitting any pollution or greenhouse gases. Wind energy generation is growing rapidly throughout the U.S. Wind energy has been growing 29% annually from 2002 to 2007 and the installed wind energy generating capacity is now over 20,000 MW (estimated by the end of 2008). Wind power currently supplies 1% of the nation's electricity, but is estimated to be capable of providing as much as 20% by 2020. Similar rapid increases in solar power generation and new solar collection systems are of considerable interest.

Unfortunately, large-scale solar collectors and generators, along with wind farms, presently have numerous disadvantages for providing power to the general public, as opposed to single-family homes, for example. Solar modules, consisting of at least one solar panel, and wind turbines are very expensive and must also be located in areas of high sun exposure and wind potential. Land for a large solar and/or wind energy generation system has to be purchased or leased. In addition, the energy developer has to purchase transmission line easements from the generator to the existing transmission power grid. As a result, the development time is long and costs are very high. Because of these restrictions, many new solar and big wind farms cannot be built for six to ten years.

In addition, such plants and energy generation stations are typically located remotely from the large urban areas experiencing the most rapid growth in the demand for electricity. For solar generation, a clear view of the sky is needed, without buildings blocking solar exposure, and for wind generation a similar clear path for wind currents must be provided. The transmission of such generated electric power over long distances has taxed the existing transmission grid to its limits, thereby adding to the nation's already most pressing energy and electric power problems, including blackouts and brownouts, energy security concerns, power quality issues, tighter emissions standards, transmission bottlenecks, and the desire for greater control over energy costs.

These transmission grid problems have constrained the development of solar and wind farms until either developers or governmental entities build new transmission capacity over long distances. This will require both huge capital investment and very long development cycles because of the need to purchase additional "rights-of-way" or easements for the new transmission lines. Such delays and capital investment substantially increase the per KWH costs of energy to the consumer, thereby making solar and wind generated electric power more expensive.

Smaller scale wind generation is also known and is typically also based on turbine driven power. However, typical wind driven turbines are relatively inefficient, often only converting a small fraction of the wind's kinetic energy into usable electrical power, and also only being effective when the wind is blowing in one particular direction within a small range of desirable speeds. Similarly, small-scale solar generation is well known, but typically is limited to only a small-scale and fixed location, such a single-family home or the like. Presently, neither solar nor wind power are readily available for usage on a public scale, such as that required to provide public charging stations for electrical vehicles.

Thus, a portable solar and wind-powered energy generating system solving the aforementioned problems is desired.

SUMMARY OF THE INVENTION

The portable solar and wind-powered energy generating system provides an ecologically friendly, portable system for generating electricity. The system may be used as a portable charging station for electrically driven vehicles, for example. The portable solar and wind-powered energy generating system includes a portable enclosure having a roof, such as a trailer, a small portable house, a shed or the like. The portable enclosure is adapted for removable positioning on a support surface, such as the ground, a concrete pad, an asphalt or blacktop surface, a parking lot or the like.

First and second solar modules are provided. Each solar module includes at least one solar panel. The first solar module is mounted on the roof of the portable enclosure. A portable vertical support is removably positioned adjacent the portable enclosure. The portable vertical support includes a base adapted for supporting the portable vertical support on the support surface and an upper end. A wind turbine is preferably mounted on the upper end.

An extensible support is further provided. The extensible support releasably supports the second solar module. The extensible support has opposed first and second ends. The first end is releasably attached to the roof of the portable enclosure, and the second end is releasably attached to the portable vertical support.

Preferably, a third solar module is further provided, and a collapsible support is mounted on the portable vertical support for releasably supporting the third solar module. The wind turbine mounted on the upper end of the portable vertical support is in electrical communication with the first, second and third solar modules, and electricity generated thereby is delivered to an electrical load, such as a storage battery, a power outlet, a charger for electrical vehicles or the like, or a combination thereof. Alternatively, the electrical energy may be transmitted into the pre-existing electrical power grid. Further, the power outlet, storage battery or other electrical load may be associated with a portable office, work site, portable educational facility or other venue.

Alternatively, the enclosure of the portable solar and wind-powered energy generating system may be removed, the system including first and second solar modules and a portable vertical support having a base adapted for supporting the portable vertical support on the support surface and an upper end. An extensible support is pivotally mounted on the upper end of the portable vertical support for releasably supporting the first and second solar modules.

In this alternative embodiment, a solar position tracker is provided for tracking the position of the sun, and the extensible support is rotatably driven so that the first and second solar modules receive a maximum intensity of solar radiation based upon the tracked position of the sun. Preferably, a wind turbine is further mounted on the upper end of the portable vertical support. The wind turbine is in electrical communication with the first and second solar modules, and electricity generated thereby is delivered to an electrical load, such as a storage battery, a power outlet, a charger for electrical vehicles or the like, or a combination thereof. Alternatively, the electrical energy may be transmitted into the pre-existing electrical power grid. Further, the power outlet, storage battery or other electrical load may be associated with a portable office, work site, portable educational facility or other venue.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
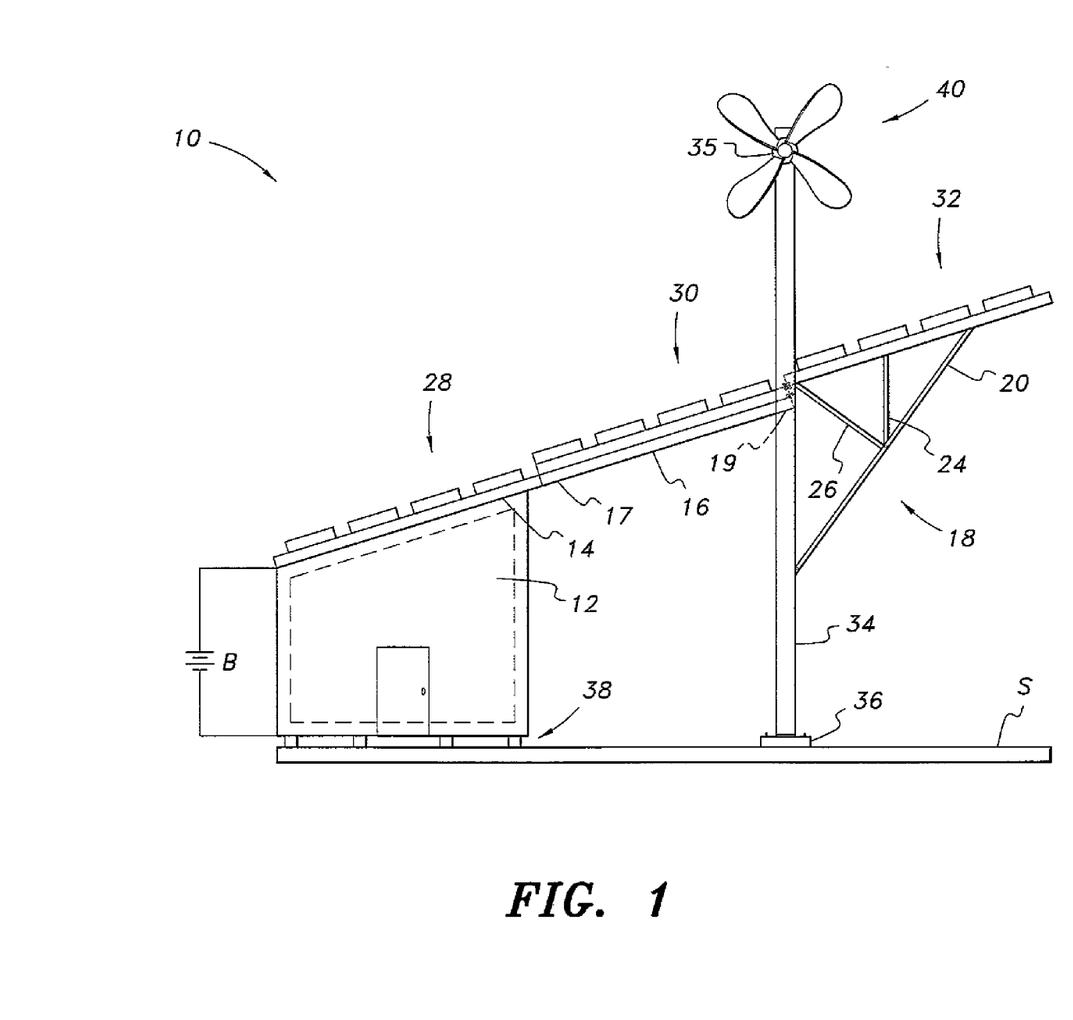
FIG. 1 is a side view of a portable solar and wind-powered energy generating system according to the present invention.

FIG. 1 illustrates a first embodiment of the portable solar and wind-powered energy generating system 10. The system 10 is an ecologically friendly, portable station for generating electricity. The portable solar and wind-powered energy generating system 10 may be used as a portable charging station for electrically driven vehicles, for example. It should be understood that the electrical power may be used for any desired purpose, such delivery to an electrical load, such as a storage battery, a power outlet, a charger for electrical vehicles or the like, or a combination thereof. Alternatively, the electrical energy may be transmitted into the pre-existing electrical power grid. Further, the power outlet, storage battery or other electrical load may be associated with a portable office, work site, portable educational facility or other venue.

Figure 2:
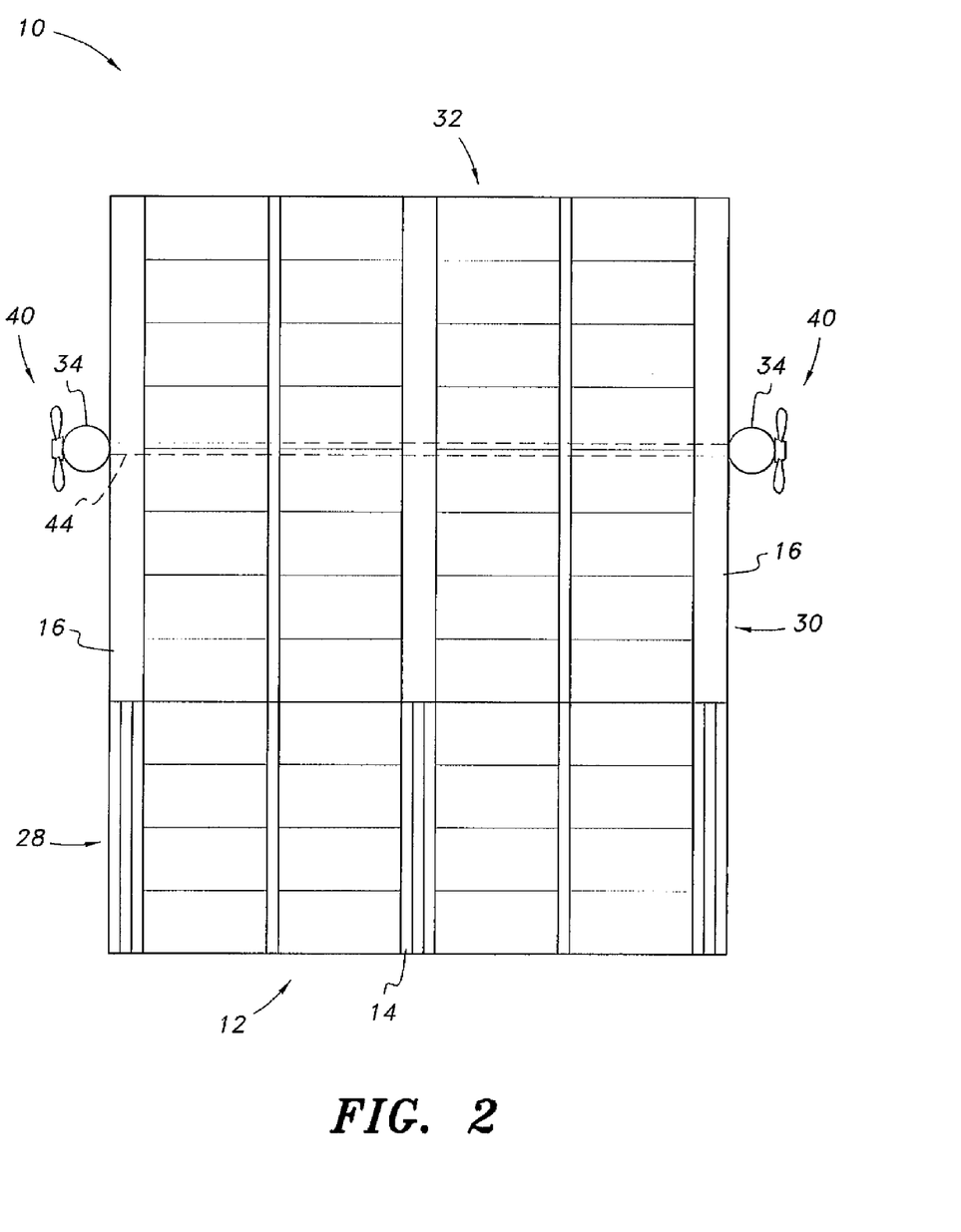
FIG. 2 is a top view of a portable solar and wind-powered energy generating system according to the present invention.

As best shown in FIGS. 1 and 2, the portable solar and wind-powered energy generating system 10 includes a portable enclosure 12 having a roof 14, such as a trailer, a small portable house, a shed or the like. The portable enclosure 12 is adapted for removable positioning on a support surface S, such as the ground, a concrete pad, an asphalt or blacktop surface, a parking lot or the like. Preferably, skids 38 or similar supports are mounted to the floor of the enclosure 12, as shown, easily removable support of the enclosure 12 on surface S.

First and second solar modules 28, 30 are provided, with each solar module 28, 30 including at least one photovoltaic solar panel. Preferably each solar module is comprised of an array of photovoltaic cells arranged in solar panels. Solar panels are well known in the art, and any suitable type of solar panel utilized for electrical energy generation may be utilized. Details of an exemplary portable photovoltaic array of solar panels arranged in an electronic circuit that generates electrical power that could be utilized in a charging station are included in U.S. Pat. No. 7,492,120, issued on Feb. 17, 2009, which is incorporated by reference in its entirety herein.

The first solar module 28 is mounted on the roof 14 of the portable enclosure 12. The portable enclosure 12 is constructed using structural insulated panels (SIPs), each of which is comprised of a core of rigid foam plastic insulation sandwiched between two structural skins of oriented strand board. Preferably, first solar module 28 is permanently fixed to the roof 14, and may be secured thereto by any suitable type of fixture or attachment, such as adhesives, bolts or the like.

A portable vertical support 34 is removably positioned adjacent the portable enclosure 12. The portable vertical support 34 includes a base 36, adapted for supporting the portable vertical support 34 on the support surface S, and an upper end 35. A wind turbine 40 is preferably mounted on the upper end 35. Wind turbines are well known in the art, and any suitable type of wind turbine utilized for electrical energy generation may be utilized. Wind turbine 40 is preferably removably mounted on the upper end 35, allowing for easy transport of system 10. Any suitable type of releasable mount may be used for removably mounted wind turbine 40 on upper end 35.

An extensible support 16 is further provided, with the extensible support 16 releasably supporting the second solar module 30. The extensible support 16 has opposed first and second ends 17, 19, respectively, with the first end 17 being releasably attached to the roof 14 of the portable enclosure 12, and the second end 19 being releasably attached to the portable vertical support 34.

Figure 4:
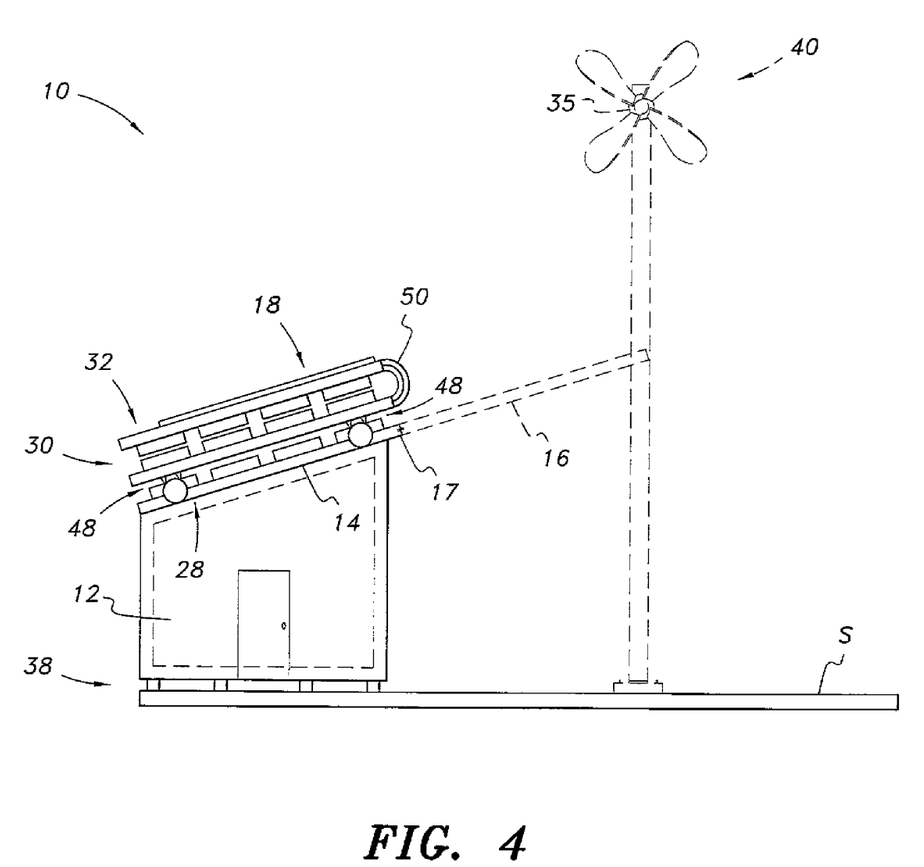
FIG. 4 is a partial side view of the portable solar and wind-powered energy generating system of FIG. 1, shown in a partially collapsed state for transportation.

In the side view of FIG. 1, only a single pole or vertical support 34 is shown. As shown in the top view of FIG. 2, vertical support 34 preferably includes a pair of poles, preferably spaced apart to the width of roof 14 of enclosure 12. A crossbar 44 preferably extends therebetween for supporting second end 19 of extensible support 16. Second end 19 may be secured to vertical support 34 through the usage of any suitable type of releasable attachment, such as hooks, removable bolts, sliding pins or the like. Similarly, as shown in FIG. 4, the first end 17 of extensible support 16 may be secured to the edge of roof 14 through the usage of any suitable type of releasable attachment, such as hooks, removable bolts, sliding pins or the like. As further shown in FIG. 2, a pair of wind turbines 40 may be provided, with each being mounted on a respective one of the poles of portable vertical support 34.

Preferably, as shown in FIGS. 1-4, a third solar module 32 is further provided, with a collapsible support 18 being mounted on the portable vertical support 34 for releasably supporting the third solar module 32. The collapsible support 18 preferably includes a main shaft 20, pivotally secured to the vertical support 34, with secondary pivotal shafts 24, 26 pivotally secured thereto for supporting the third solar module 32. Alternatively, as shown in the collapsed state of FIG. 4, the collapsible support 18 may be permanently, pivotally secured to the lower surface of third solar module 32.

In the transportable, collapsed configuration of FIG. 4, first solar module 28 is preferably permanently mounted to roof 14. Clamps 48, or any other suitable type of releasable fasteners, releasably secure the lower surface of second solar module 30 to the first solar module 28. As shown, abutting ends of second solar module 30 and third solar module 32 are joined to one another by a hinge 50, which may be any suitable type of hinge or pivot. First, second and third solar modules 28, 30, 32 are electrically connected in the fully deployed configuration of FIG. 1.

As an alternative, the folded second solar module 30 and third solar module 32 may be fixed to the sidewall of enclosure 12, or may be removed altogether, with the enclosure 12 (and the fixed first solar module 28) being positioned separately from the folded second and third solar modules 30, 32. The enclosure 12, folded second and third solar modules 30, 32 (with attached collapsible support 18), portable vertical support 34, and extensible support 16 (along with any other associated elements, such as a separate storage battery B) may be easily loaded onto a truck, into a trailer or the like, and transported to any desired location.

Upon deployment, enclosure 12 is unloaded from the truck, trailer or the like, support on support surface S by skids 38, and portable vertical support 34 is positioned on support surface S, away from enclosure 12, such that extensible support 16 may be releasably mounted therebetween. Wind turbine 40 is mounted on the upper end of vertical support 34, and second solar module 30 is mounted on extensible support 16. Third solar module 32 is unfolded from second solar module 30, with collapsible support 18 extending downwardly therefrom to contact vertical support 34 (the lower end thereof may be secured to vertical support 34 by any suitable type of releasable fixture, such as removable bolts, sliding pins or the like) an provide positioning and support for third solar module 32.

Figure 3:
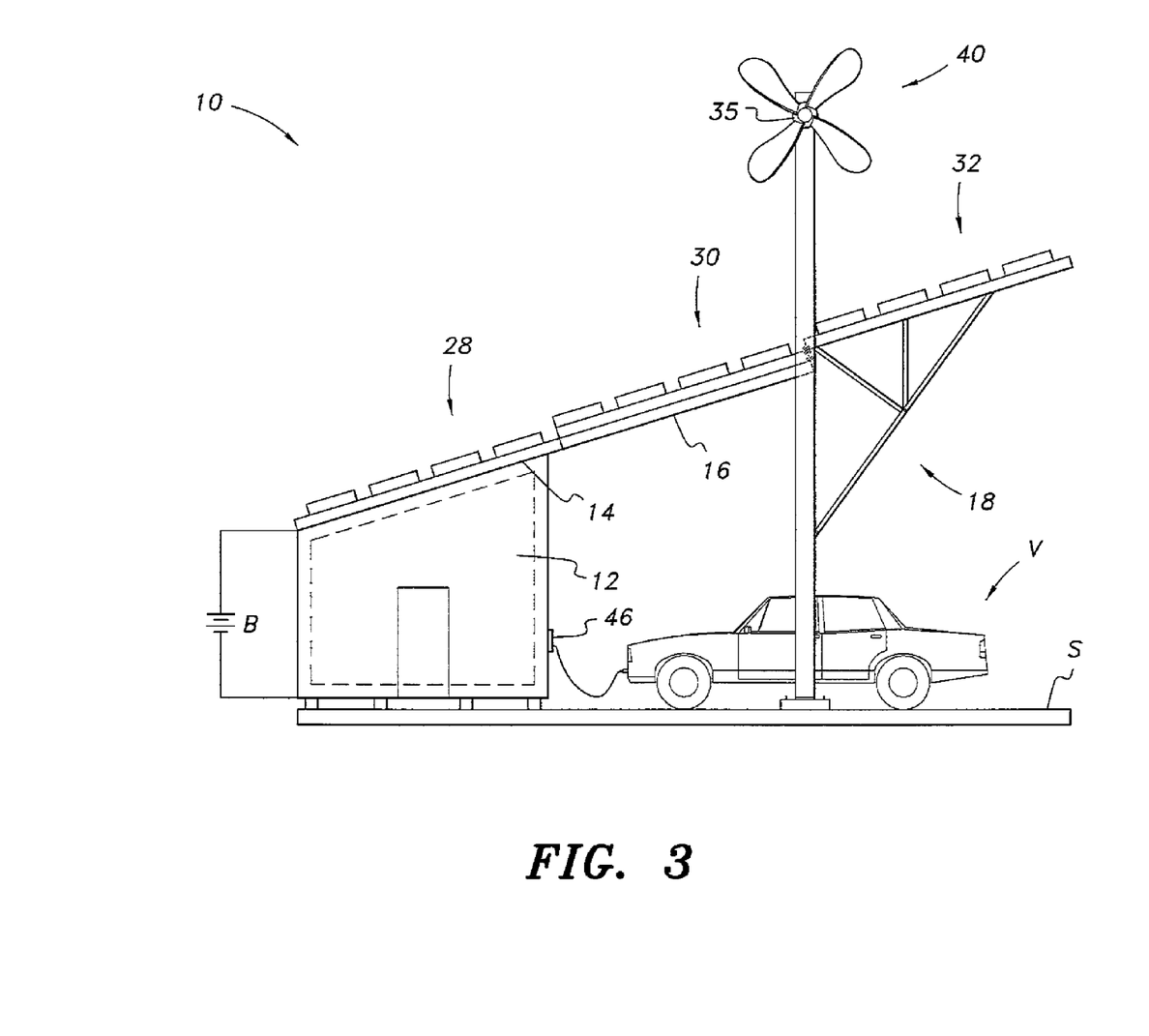
FIG. 3 is a side view of the portable solar and wind-powered energy generating system of FIG. 1, shown being utilized as a charging station for an electric vehicle.

The wind turbine 40 mounted on the upper end 35 of the portable vertical support 34 is in electrical communication with the first, second and third solar modules 28, 30, 32, and electricity generated thereby is delivered to an electrical load, such as a storage battery or battery bank B, a power outlet, a charger for electrical vehicles or the like, or a combination thereof. FIG. 3 illustrates an exemplary electrical vehicle V charging via an outlet 46, which is in electrical communication with storage battery B. It should be understood that wind turbine 40 and first, second and third solar modules 28, 30, 32 may be used to supplement the electrical grid, may be used to replace the power provided by the electrical grid, may be used with or without storage battery or battery bank B, or may be used to power any desired electrical load.

Additionally, it should be understood that system 10 may be used in combination with any desired additional structural elements. For example, the second and third solar modules 30, 32 provide an awning-like cover, which may be used in combination with, for example, a tarp to create a secondary garage-like enclosure for vehicle V of FIG. 3. Such a tent may be alternatively utilized for any desired purpose that requires the usage of electricity, such as an entertainment show or the like. Further, upon deployment, the supports may and solar modules may be manually positioned and deployed, or may include additional drive elements, such as hydraulic cylinders or the like, allowing for automated deployment thereof.

Figure 6:
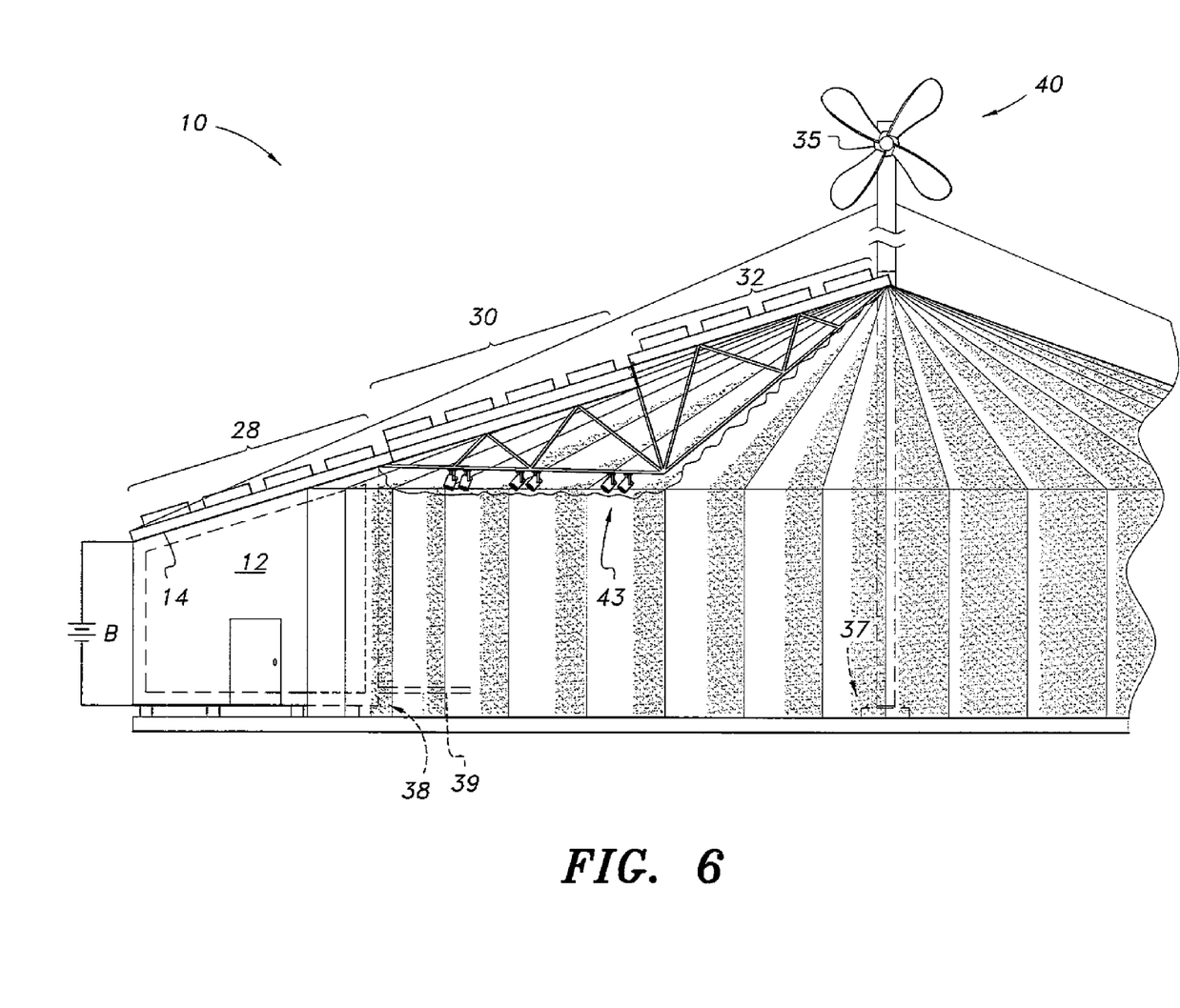
FIG. 6 is a side view of another alternative embodiment of the portable solar and wind-powered energy generating system.
Figure 9:
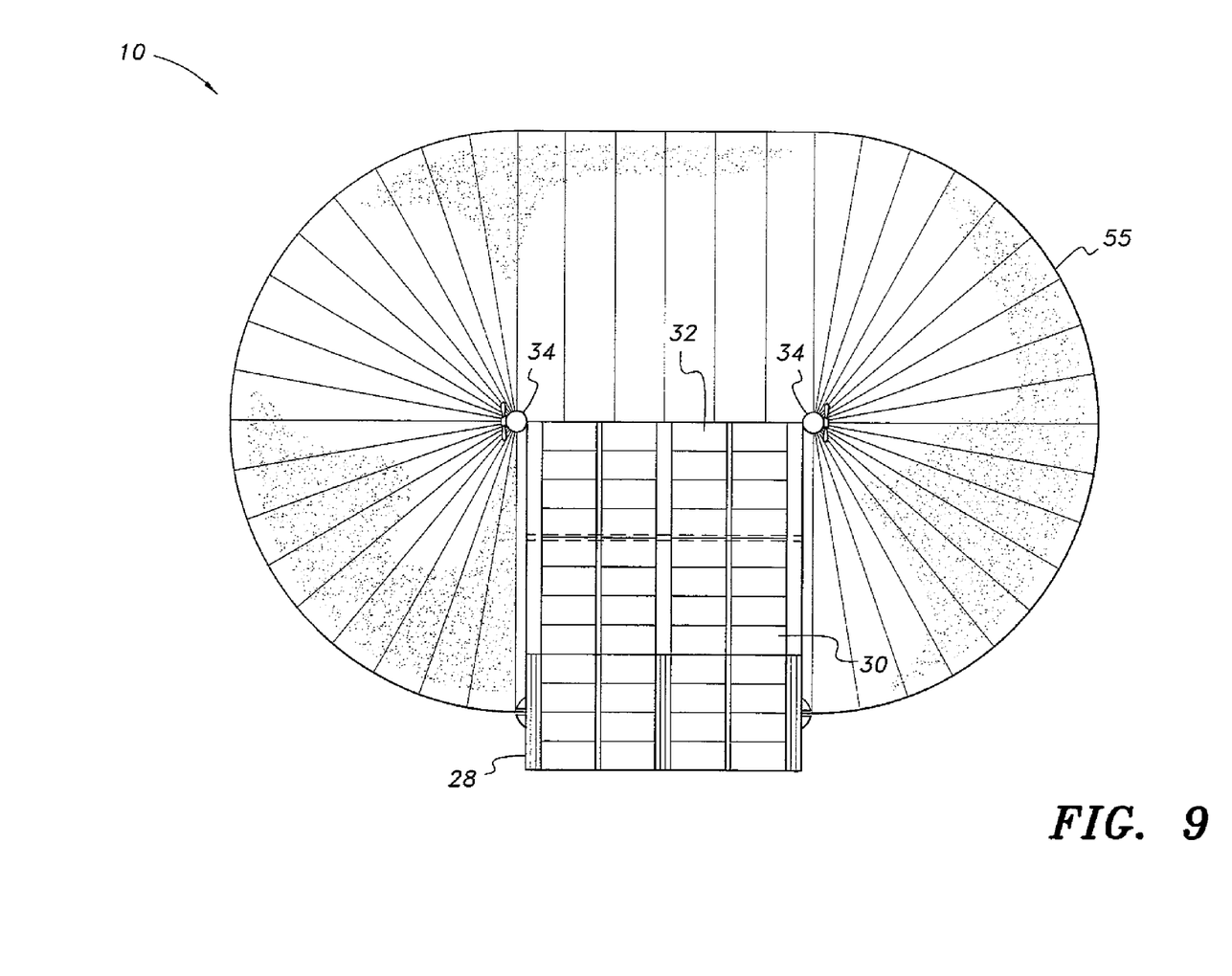
FIG. 9 is a top view of the portable solar and wind-powered energy generating system of FIG. 6.

In the embodiment of FIG. 6, the system 10 of FIG. 1 has been modified to include such a tent portable vertical support, which is draped from second and third solar modules 30, 32, as shown. Additionally, truss 41 may be suspended from at least second solar module 30 for supporting lights 43 or the like, which may shine on a stage 39. In FIG. 6, both the second solar module 30 and the third solar module 32 are shown being extended, with the free end of third solar module 32 being supported by the vertical support 34. Truss 41 extends across the lower surfaces of both the second and third solar modules, with the truss preferably having a folding center point positioned beneath the hinged junction between the second and third solar modules 30, 32. As an additional alternative, base 36 may be modified to include a pivoting structure 37, allowing for easy collapse of vertical support 34. It should be understood that FIG. 6 represents a partial view of the tent structure. Preferably, the tent 55 forms a full enclosure, as illustrated in the top view of FIG. 9. In FIG. 9, it should be noted that a pair of turbine support poles 34 are shown, as in FIG. 2.

Figure 8:
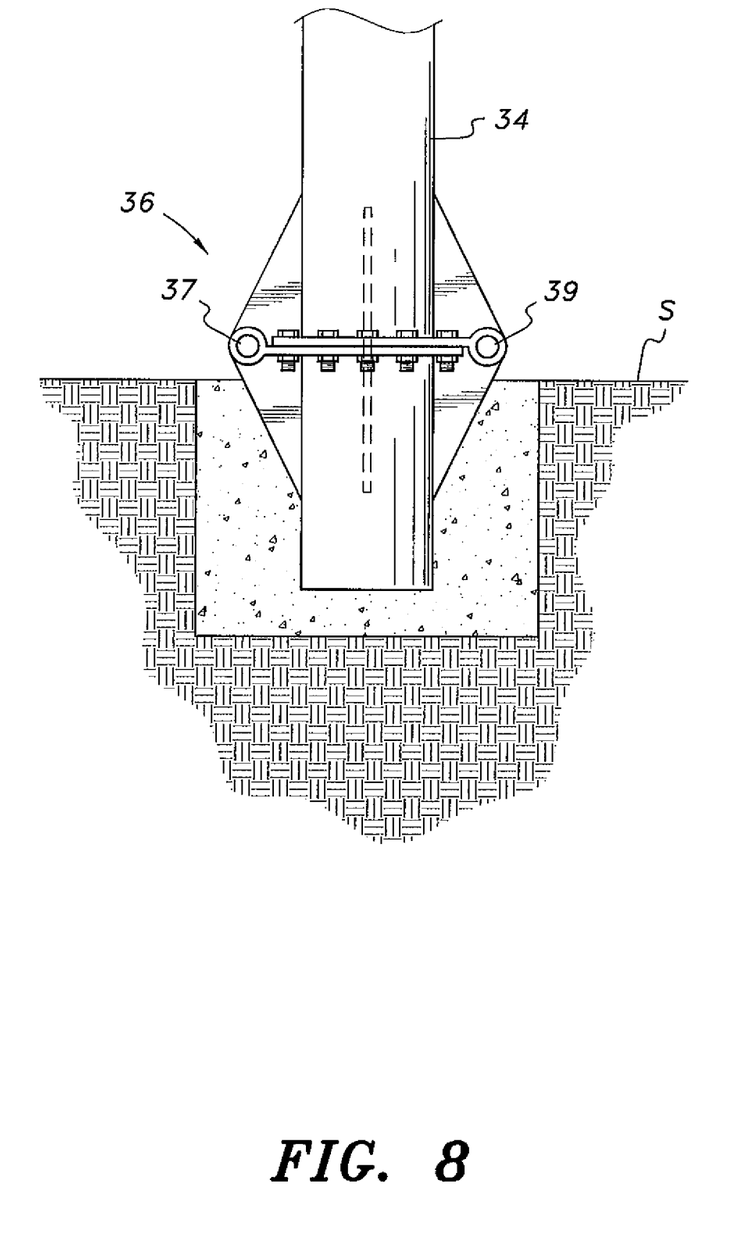
FIG. 8 is a partial view of a mounting structure for a pole of the portable solar and wind-powered energy generating system of FIG. 1.

FIG. 8 illustrates one such mounting structure, with the lower end of vertical support 34 being first sunk into the support surface, which may be a poured concrete base or the like, and with base 36 being seated on the surface thereof, post-hardening. Base 36 includes pivot hinge 37 on one side thereof, as shown, with a corresponding locking pin 39 or the like secured to the other end thereof. As shown, any suitable types of bolts or other removable attachments may further be applied.

Figure 7:
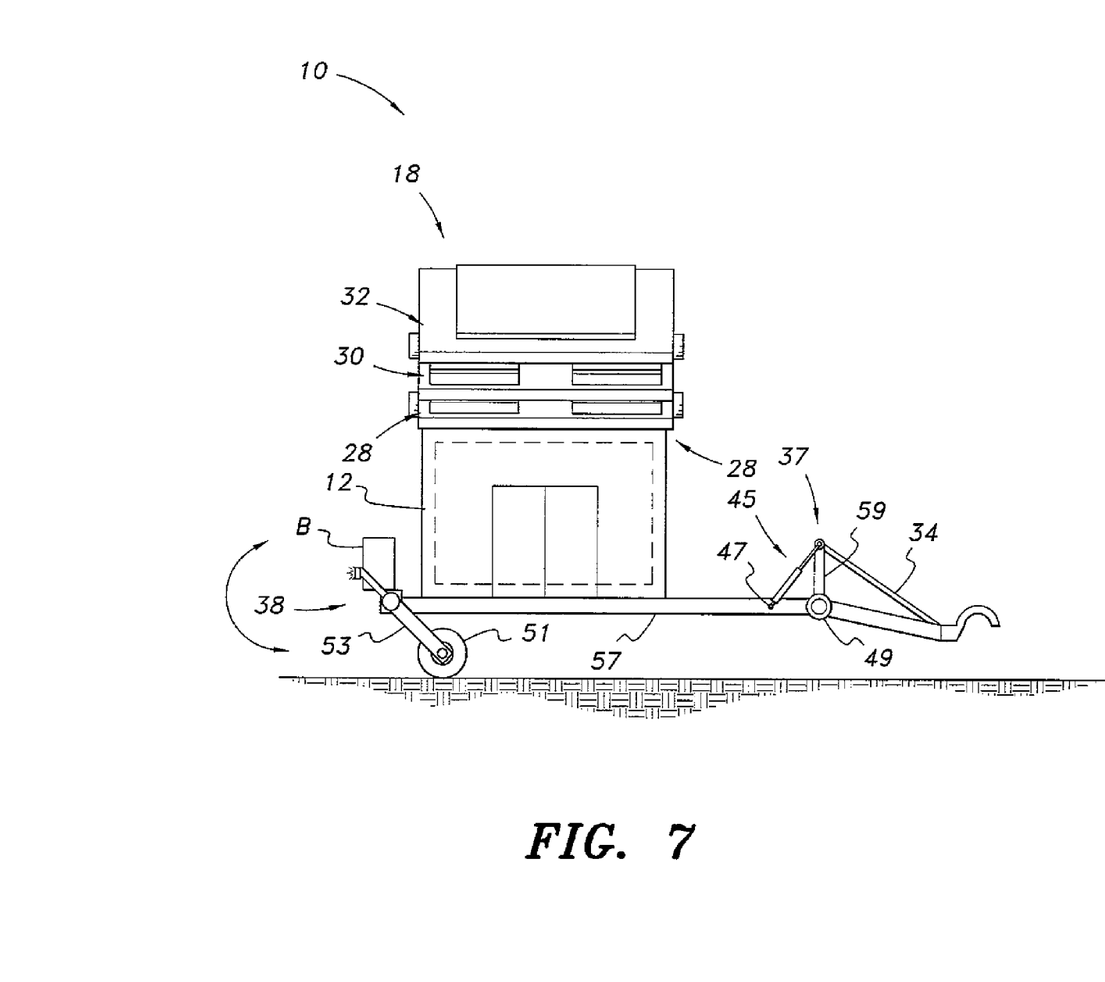
FIG. 7 is a partial side view of the portable solar and wind-powered energy generating system of FIG. 1, shown being transported.
Figure 10:
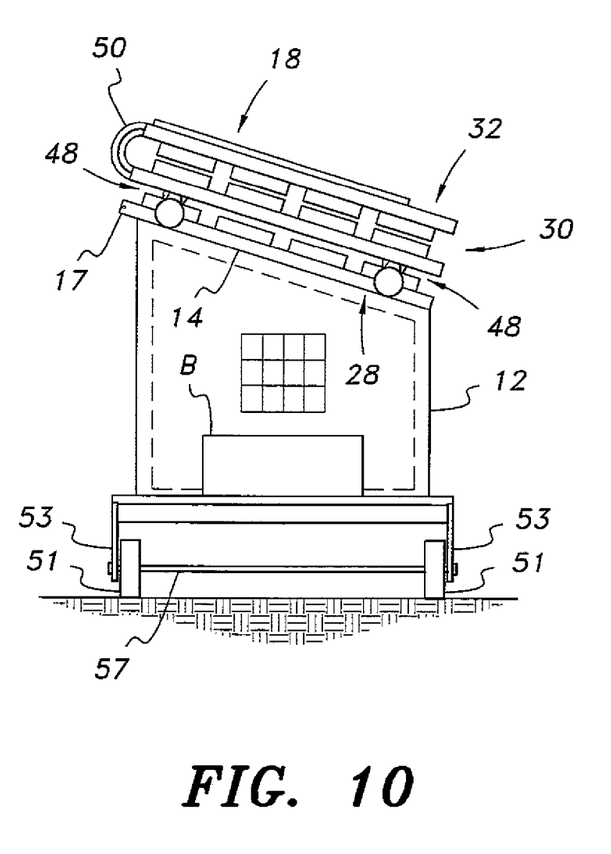
FIG. 10 is a rear view of the portable solar and wind-powered energy generating system of FIG. 1, shown being transported.

FIGS. 7 and 10 illustrate the system 10 of FIG. 1 in the collapsed state and loaded onto a mobile support 57 or the like for transport. Support 57 is the main support for the building, allowing the entire unit to be easily moved. Support 57 has a configuration similar to that of a conventional trailer, but by providing mobile support 57, the structure does not have to be separately lifted onto (and removed from) an external trailer. Preferably, a hydraulic cylinder 45 is pivotally secured to the support 57 for three-way pivotal interconnection between a support rod 59 (which is also pivotally secured to the support 57 at 49) and the vertical support 34. It should be understood that any suitable type of raising or lowering device may be used for raising the building support. The support 57 includes wheel 51 at one end thereof. The opposite end has a conventional trailer hitch or the like mounted thereto, as shown. Wheel 51 is mounted on a rotating support 53, which may be rotated upwardly, away from the ground, when transportation is completed, thus allowing trailer 57 to rest on the ground (with rotation being indicated by the directional arrow in FIG. 7). As shown, torsion axle or support 53 may also be used to secure battery pack B to the side of housing 12. Rotating supports 53 are best shown in the rear view of FIG. 10. It should be understood that the building 12 may be positioned 90 degrees or 180 degrees from the orientation shown, with respect to support 57.

It should be understood that enclosure 12, roof 14, solar modules 28, 30, 32, vertical support 34 and collapsible support 18 may have any desired configuration, size or dimensions, depending upon the desired usage thereof. Moreover the solar modules 28, 30, 32 may have any type of azimuth or elevation adjustment feature for unison or individual control of said modules. Extensible support 16 may be any suitable type of support, such as detachable rails or the like, and any suitable type of collapsible support 18 may be utilized. Similarly, any suitable type of electrical connection between wind turbine 40, solar modules 28, 30, 32, battery B and outlet 46 may be utilized.

Figure 5:
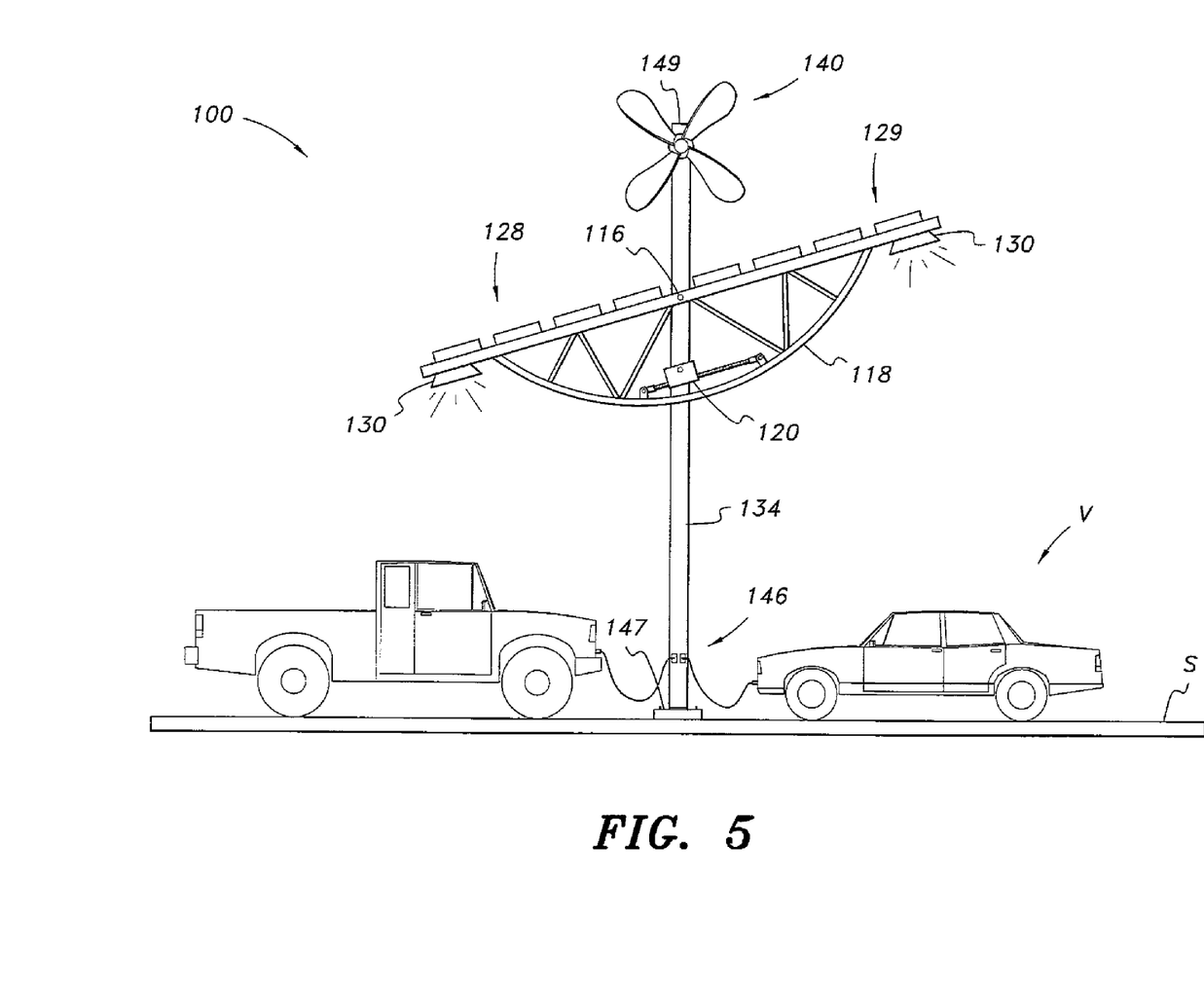
FIG. 5 is a side view of an alternative embodiment of the portable solar and wind-powered energy generating system according to the present invention.

Alternatively, as shown in FIG. 5, the enclosure 12 may be removed, with system 100 of FIG. 5 including first and second solar modules 128, 129, respectively, and a portable vertical support 134 having a base 147 adapted for supporting the portable vertical support 146 on the support surface S and an upper end 149. An arcuate support 118 is pivotally mounted on the portable vertical support 134 for releasably supporting the first and second solar modules 128, 129. The arcuate base includes support trusses that contact and support the deployed solar modules 128 and 129. Alternatively, multiple vertical supports may be utilized, allowing a series-type connection of multiple units.

In this alternative embodiment, a solar position tracker and drive system 120 is provided for tracking the position of the sun, and the support 118 is rotatably driven such that the first and second solar modules 128, 129 receive a maximum intensity of solar radiation based upon the tracked position of the sun. Tracking is preferably performed for both the daily movement of the sun across the sky, as well as seasonal changes of positioning of the sun. Such solar tracking and drive systems for solar modules are well known in the art, and any suitable type of tracking and drive system may be utilized. Examples of such systems are shown in U.S. Pat. Nos. 7,569,764; 7,501,572; and 7,339,739, each of which is herein incorporated by reference.

Preferably, a wind turbine 140 is further mounted on the upper end 149 of the portable vertical support 134. The wind turbine 140 is in electrical communication with the first and second solar modules 128, 129, and electricity generated thereby is delivered to an electrical load, such as a storage battery or a power outlet 146, used as a charger for electrical vehicles or the like. Additional electrical loads, such as lights 130, may further be powered by the electricity generated by wind turbine 140 and first and second solar modules 128, 129. Alternatively, as described in the previous embodiments, the electrical power may be used for any desired purpose, such delivery to an electrical load, such as a storage battery, a power outlet, a charger for electrical vehicles or the like, or a combination thereof. Alternatively, the electrical energy may be transmitted into the pre-existing electrical power grid. Further, the power outlet, storage battery or other electrical load may be associated with a portable office, work site, portable educational facility or other venue.

It is to be understood that the present invention is not limited to the embodiments described above, but encompasses any and all embodiments within the scope of the following claims.

I claim:

1. A portable solar and wind-powered energy generating system, comprising:
   a portable enclosure having a roof;
   first and second solar modules, each of the solar modules having at least one photovoltaic solar panel, the first solar module being permanently fixed to the roof of the portable enclosure at a fixed disposition;
   a portable vertical support removably positioned adjacent to and spaced apart from the portable enclosure;
   an extensible support for releasably supporting the second solar module thereon, the extensible support having opposed first and second ends;
   means for releasably attaching the first end of the extensible support to the roof of the portable enclosure, wherein the extensible support extends outwardly from the roof of the portable enclosure;
   means for releasably attaching the second end of the extensible support to the portable vertical support; and
   means for selectively transmitting electricity generated by the first and second solar modules to an electrical load.

2. The portable solar and wind-powered energy generating system according to claim 1, further comprising:
   a third solar module in electrical communication with said first and second solar modules; and
   a collapsible support mounted on said portable vertical support for releasably supporting the third solar module.

3. The portable solar and wind-powered energy generating system according to claim 1, further comprising a wind turbine mounted on said portable vertical support, the wind turbine being in electrical communication with said means for selectively transmitting the electricity generated by said first and second solar modules to the electrical load.

4. The portable solar and wind-powered energy generating system according to claim 2, wherein said collapsible support for said third solar module further comprises:
- a main shaft pivotally secured to said portable vertical support; and
- secondary pivotal shafts pivotally secured to the main shaft.

5. The portable solar and wind-powered energy generating system according to claim 2, further comprising:
- a plurality of clamps releasably securing a lower surface of said second solar module to said first solar module; and
- a hinge connecting said third solar module to said second solar module.

* * * * *